United States Patent [19]
Watanabe et al.

[11] Patent Number: 4,931,168
[45] Date of Patent: Jun. 5, 1990

[54] GAS PERMEABLE ELECTRODE

[75] Inventors: Masahiro Watanabe, No. 2-10, Kitashin 1-chome, Kofu-shi, Yamanashi; Satoshi Motoo, No. 5-24, Takeda 3-chome, Kofu-shi, Yamanashi; Nagakazu Furuya, No. 4-3-31, Ohte 2-chome, Kofu-shi, Yamanashi, all of Japan

[73] Assignees: Masahiro Watanabe, Japan; Satoshi Motoo, Japan; Nagakazu Furuya, Japan; Tanaka Kikinzoku Kogyo, Japan

[21] Appl. No.: 356,612

[22] Filed: May 23, 1989

Related U.S. Application Data

[63] Continuation of Ser. No. 22,437, Mar. 6, 1987, abandoned.

[51] Int. Cl.$^5$ .............................................. C25B 11/03
[52] U.S. Cl. .................................... 204/284; 204/283; 204/290 R; 204/294; 429/40; 429/42
[58] Field of Search .................. 204/282, 283, 290 R, 204/294, 284; 429/40, 42, 33

[56] References Cited

U.S. PATENT DOCUMENTS

| | | | |
|---|---|---|---|
| 3,854,994 | 12/1974 | Binder et al. | 429/40 |
| 3,956,014 | 5/1976 | Landsman et al. | 429/42 |
| 4,091,176 | 5/1978 | Alfenaar | 429/42 |
| 4,444,852 | 4/1984 | Lui et al. | 429/42 |
| 4,615,954 | 10/1986 | Solomon et al. | 429/42 |

FOREIGN PATENT DOCUMENTS 1127955 9/1968 United Kingdom ................. 429/42

Primary Examiner—John F. Niebling
Assistant Examiner—Kathryn Gorgos
Attorney, Agent, or Firm—Klauber & Jackson

[57] ABSTRACT

Disclosed herein is a gas permeable electrode which comprises a gas permeable layer and a reaction layer, the reaction layer comprising hydrophobic portions and hydrophilic portions. Electrolyte penetrates into the reaction layer and does not penetrate into the gas permeable layer, and only the gas produced on the electrode and the gas supplied penetrate into the gas permeable layer. The gas can be released from the rear side of the electrode and the reaction surface thereof is never covered with the gas.

11 Claims, 11 Drawing Sheets

FIG. 1
PRIOR ART
(a)
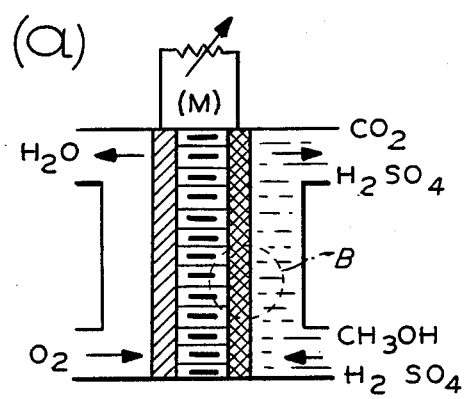
(b)
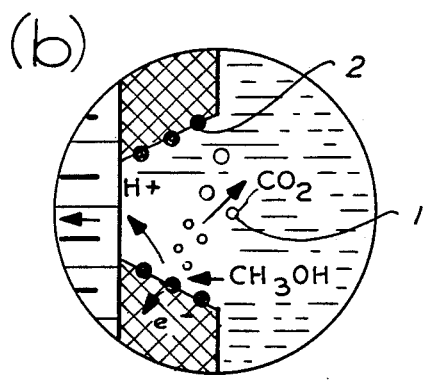
FIG. 2
(a)
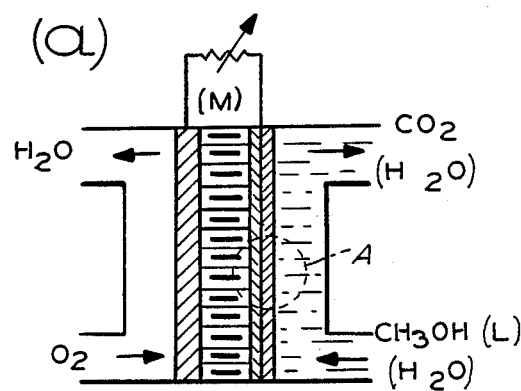
(b)
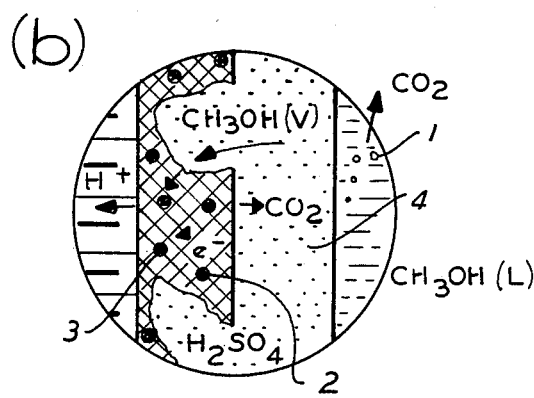
FIG. 7
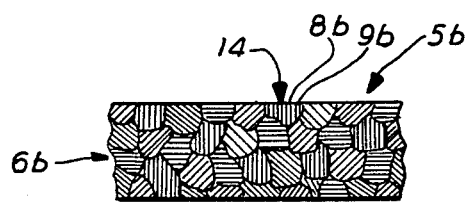
FIG. 8(a)
FIG. 9
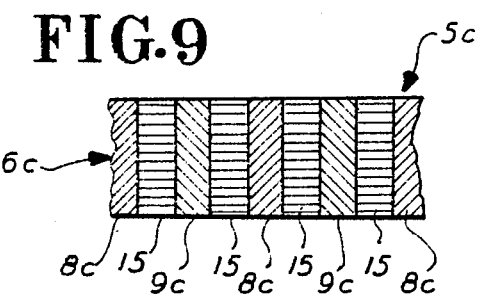
FIG. 8(b)
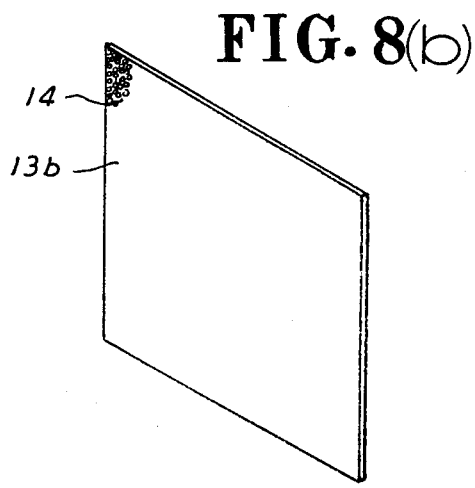

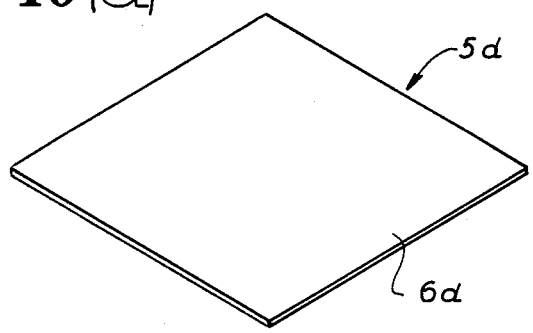
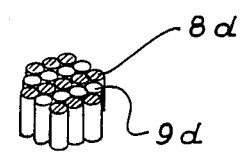
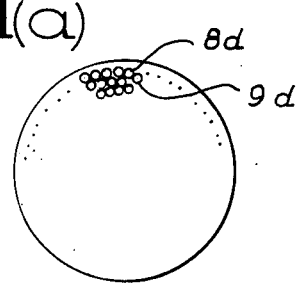
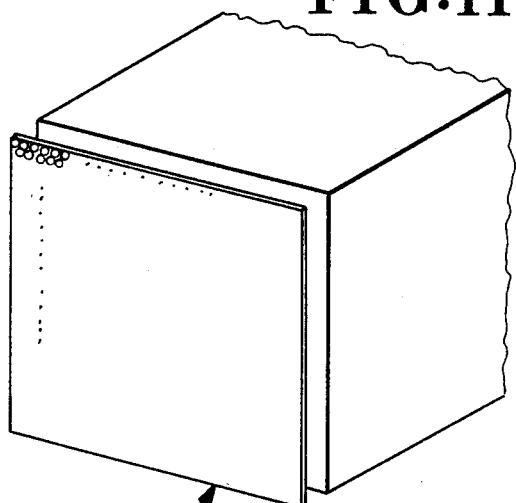
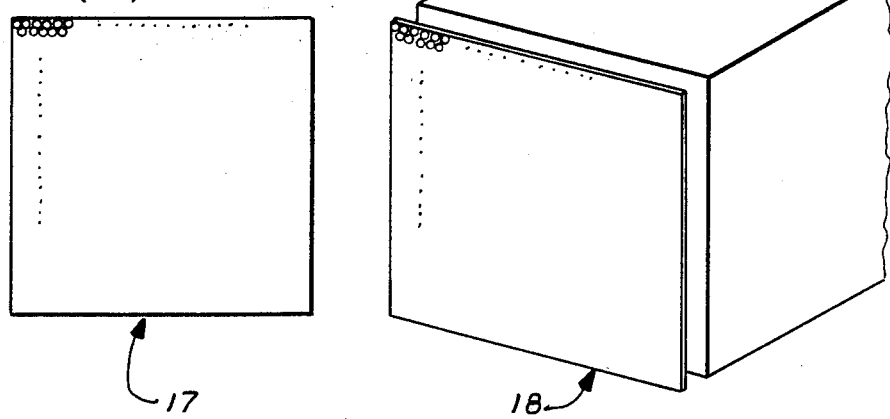
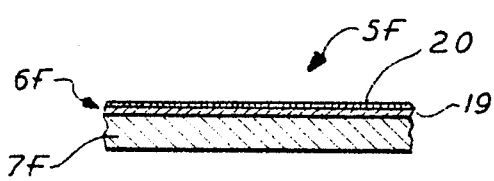
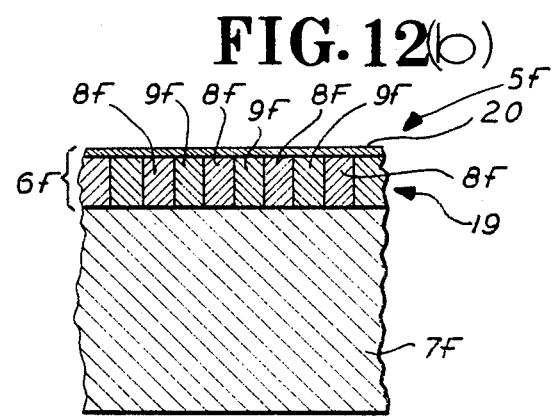

FIG.15
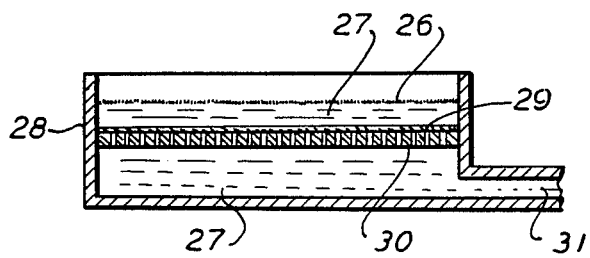
FIG.16
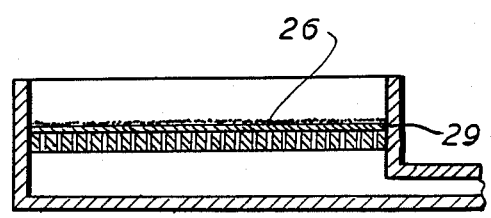
FIG.17
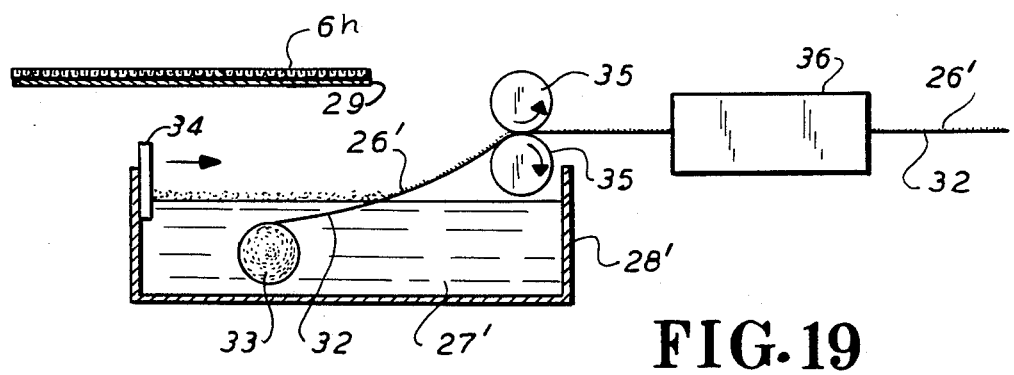
FIG.18
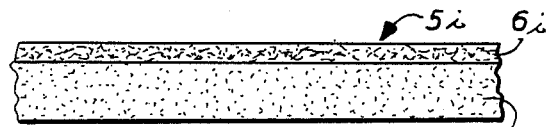
FIG.19
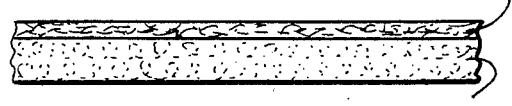
FIG.20(a)
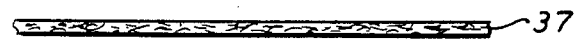
FIG.20(c)
FIG.20(b)
FIG.20(d)
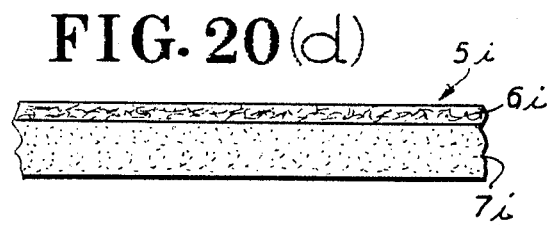

FIG. 21
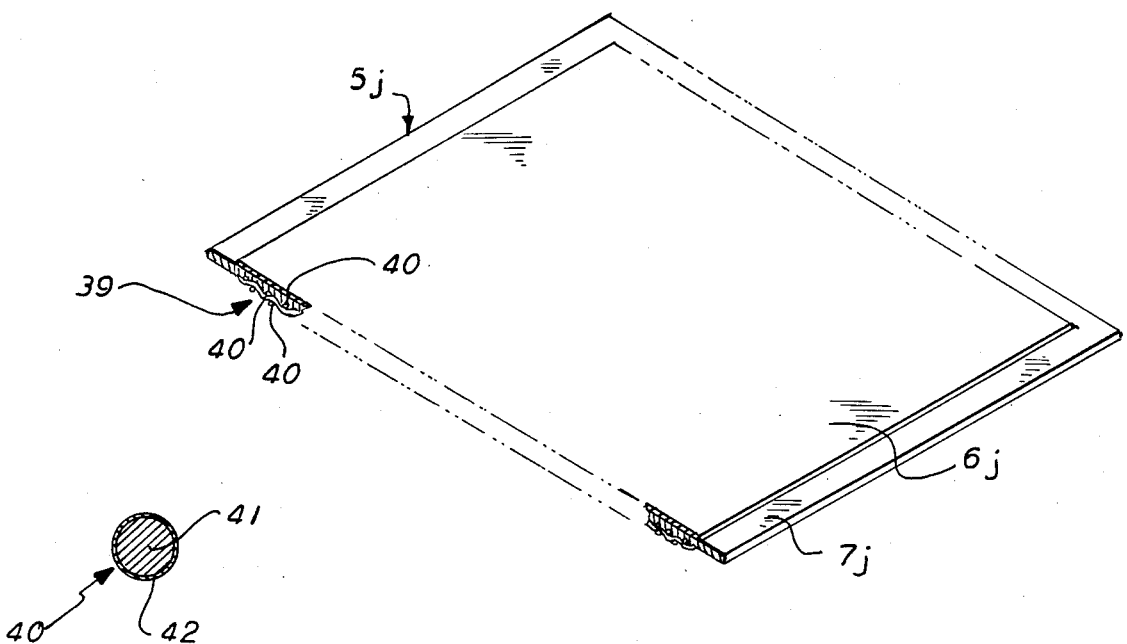
FIG. 22
FIG. 23
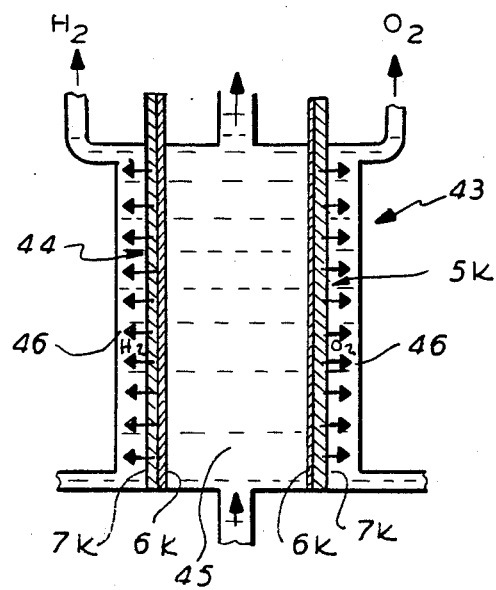

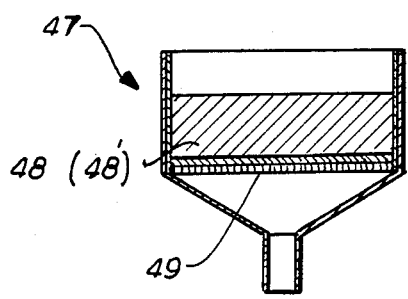
FIG. 24
FIG. 25(a)
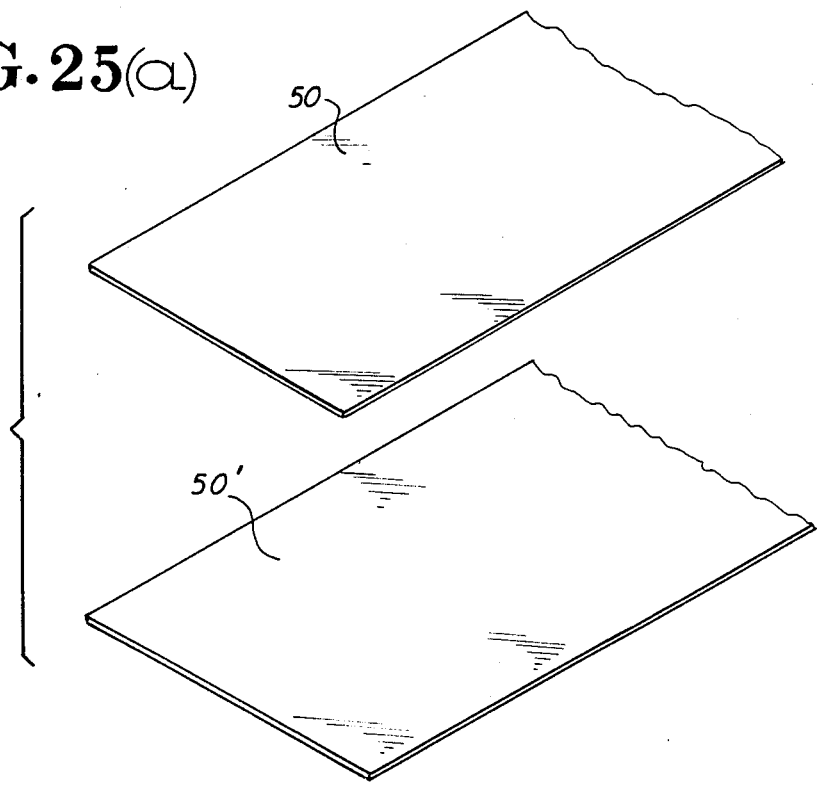
FIG. 25(b)
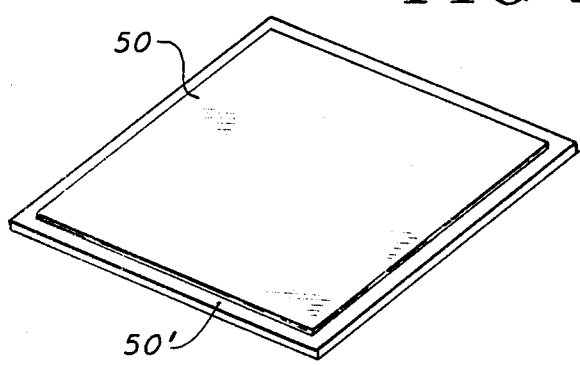

GAS PERMEABLE ELECTRODE

This application is a continuation, of application Ser. No. 022,437, filed Mar. 6, 1987 now abandoned.

BACKGROUND OF THE INVENTION

This invention relates to a gas permeable electrode of so-called BFE (Backward Feed & Exhaust) type which comprises a reaction layer and a gas permeable layer attached to each other, and is employed as an electrode for a methanol fuel cell and a secondary battery and for reducing potential of an electrolytic bath and for the like.

A conventional electrode for a methanol fuel cell and so on comprises a metal mesh, a carbon fiber cloth or the like supporting catalysts. The methanol is dissolved in a strong acid or alkali, for example sulfuric acid, to be supplied as electrolytic to be circulated therein. The constitution of this cell and the enlarged view of the portion indicated by B are shown in FIGS. 1 ($a$) and ($b$), respectively.

This electrode for the methanol fuel cell has a problem that carbon dioxide bubbles 1 produced as one of the reaction products cover the surface of catalysts 2 to result in a lowering of effectiveness of the catalysts and of electrode characteristics. The main use of the methanol fuel cell is considered to be a transportable or mobile electric source, and the circulation of the strongly corrosive electrolyte is dangerous and may lead to the corrosion of the equipment employed. Moreover, the corroded product may bring about the poisoning of the catalysts. Purification of electrolyte and water is further required to prevent the poisoning of the catalysts.

SUMMARY OF THE INVENTION

The present invention overcomes the above disadvantages.

An object of the invention is to provide a gas permeable electrode without the lowering of the effectiveness of catalysts due to product bubbles such as carbon dioxide.

Another object of the invention is to provide a gas permeable electrode employing no corrosive electrolyte.

A further object of the invention is to provide a gas permeable electrode requiring no purification of water and fuel employed.

A gas permeable electrode according to the present invention comprises a gas permeable layer comprising hydrophobic resins and an electrically conductive porous body or electrically conductive fine powders, and a reaction layer comprising a semi-hydrophobic porous body prepared by the coagulation of hydrophobic portions and hydrophilic portions, both layers being attached to each other, the electrolyte impregnating the hydrophilic portion of the reaction layer to be held therein, and the hydrophobic portions thereof constituting gas passages.

When this electrode is applied to a fuel cell or the like, electrolyte penetrates into the reaction layer and does not penetrate into the gas permeable layer, and only the gas produced on the electrode and the gas supplied penetrate into the gas permeable layer.

DETAILED DESCRIPTION OF THE INVENTION

The reaction layer of the electrode comprises a semi-hydrophobic porous body which may contain an electrically conductive porous body or fine particles and hydrophobic resins impregnated or dispersed to be mixed therein, which is then thermally treated. This reaction layer can be replaced by another semi-hydrophobic body manufactured by mixing fine particles supporting catalysts and fine particles with no catalyst provided with hydrophobic property by adding hydrophobic resins.

The above electrically conductive porous body or fine particles may be hydrophilic or hydrophobic carbon blacks or the like, and the above hydrophobic resins may be polytetrafluoroethylene (hereinafter referred to as PTFE) or other fluorinated resins or the like. The above catalysts may contain platinum group metals such as platinum, palladium, rhodium, ruthenium etc., gold, silver, iron, nickel and cobalt and/or their oxides or alloys, activated carbon and the like. The carbon blacks and/or the catalysts serve as electrode active components.

When the porous body comprises the PTFE powders and the carbon blacks, the proportion of the hydrophobic resins to the reaction layer is preferably in the range of 8:2 to 2:8, most preferably 3:7. The gas permeable layer ideally has perfect hydrophobic property and high gas permeability. In the case of the combination of the PTFE powders and the carbon blacks, its ratio is preferably 6:4.

Since the above reaction layer which contains the catalysts is made by depositing the catalysts on the fine particles which can be hydrophilic carbon blacks and mixing them with fluorinated carbon such as PTFE to be bound with each other, the reaction layer does not always provide the structure which allows the electrolyte to penetrate to the catalyst portions and which has the catalyst portions to which the electrolyte penetrates and the gas permeation passages, both of which are uniformly and finely dispersed. Therefore, some of the catalysts in the reaction layer are not in contact with the electrolyte so that they do not contribute to the reaction, and the contact area between the electrolyte and the gas permeation passages is insufficient so that it lowers the catalyst performance.

In Japanese patent laid open No. 62(1987)-187769, filed Feb. 13, 1986, laid open Aug. 17, 1987, assigned to Denkikagaku Kogyo (Electrochemical Industry) K.K., the preparation of hydrophilic carbon blacks from hydrophobic ones is described in which the essential feature is to partially oxidize the hydrophobic carbon blacks in an atmosphere containing oxygen.

The intrinsically hydrophilic carbon blacks so produced are available from the same company, Denkikagaku Kogyo K.K. which is located at No. 4-1, Yuraku-cho 1-Chome, Chiyoda-Ku, Tokyo, Japan.

To improve this inefficiency, several means can be proposed. For instance, a plurality of the thinly formed hydrophilic portions containing the catalysts and the same number of the thinly formed hydrophobic portions can be superimposed alternately to constitute the reaction layer. In another instance which is more effective, a plurality of the ultra-thinly formed hydrophilic portions and the same number of the ultra-thinly formed hydrophobic portions are superposed alternately to form a powder, and the bulk of the said powders can be coagulated to constitute a reaction layer shaped as a sheet. In a further instance which is much more effective, mixed portions whose property is intermediate between those of the hydrophilic portions and the hydrophobic portions in the above instances can be interposed therebetween.

Other than the above three examples, the following means can be employed. At first, a plurality of fine fiber-like hydrophilic portions and/or hydrophobic portions which are oriented towards the thickness of the sheet and of which both ends are exposed to both sides are randomly dispersed in the sheet to form a reaction layer. Secondly, powders each comprising the fiber-like hydrophilic portions and the hydrophobic portions are coagulated to form a reaction layer.

In the meantime, since the catalysts supported in the hydrophilic portions of the reaction layer do not firmly adhere to the fine particles, they may be dissolved out by exposure to electrolyte during the use in a secondary battery or the like, or may be moved to be coagulated with the rise of temperature. The catalyst activity of the hydrophilic portions may be thus lowered, and the charging rate and the discharging rate may be lowered to shorten the life. To overcome this disadvantage and to provide a gas permeable electrode with ion separation capacity, the following means can be employed. Ion exchange resin is added to the hydrophilic portions in addition to the catalysts supported therein to form a reaction layer comprising a hydrophilic layer and a hydrophobic layer.

On the other hand, the gas permeable layer comprises a highly hydrophobic porous body which contains an electro-conductive porous body or fine particles and hydrophobic resins impregnated or dispersed to be mixed therein, which is then thermally treated. This high hydrophobic property can be obtained by increasing the volume of the resins in the gas permeable layer or by adding such hydrophobic reinforcing agents as wax, fluorinated graphite and the like.

The reaction layer and the gas permeable layer are attached to each other by a conventional press-molding or hot-pressing to constitute the gas permeable electrode. Since the thus manufactured electrode is very thin, it is inadequate in strength and readily bent or warped so that deformation or cracks may occur. When a crack develops in the gas permeable layer, electrolyte passes through the layer along the crack so that the gas permeable layer loses the hydrophobic property. One of the solutions of this inefficiency is to strengthen the electrode by employing a reinforcing sheet, e.g. a non-woven fabric sheet. The non-woven fabric sheet is preferably a heat resistant fabric which is made of carbon fiber, nickel fiber, stainless steel fiber, aramide fiber, silicon carbide fiber or the like. The non-woven farbic sheet may be incorporated in the reaction layer and/or the hydrophobic layer.

One of the general manufacturing processes of the gas permeable electrode containing the catalysts is as follows. The mixed suspension of platinum powders, carbon blacks, water and PTFE powders is filtered to make a first cake, and another mixed suspension of hydrophobic carbon blacks, water and PTFE powders is filtered to make a second cake. Then, after both cakes are rolled and dried to make a reaction layer and a gas permeable layer, respectively, both layers are cut to a desired dimension and then attached to each other by heat-pressing. Since, however, the platinum powders of the gas permeable electrode obtained according to the above manufacturing process may be mainly present among the carbon blacks and the PTFE powders which are hydrophobic or among the PTFE powders, electrolyte is not in contact with all the platinum particles, even though it penetrates to the reaction layer. It is also difficult in the above process to roll-mold both layers, and further since scrap containing the platinum is produced in cutting them to the desired dimension, labor and expense are required to recover it.

In order to overcome the inconveniences the catalysts may be incorporated into the reaction layer after both layers are attached to each other. One of the examples of this process is as follows.

The mixed suspension of hydrophilic and hydrophobic carbon blacks, water (or such solvent as alcohol) and PTFE powders is filtered to make a first cake, and another mixed suspension of hydrophobic carbon blacks, water (or such solvent as alcohol) and PTFE powders is filtered to make a second cake. After both cakes are penetrated with a solvent, both are rolled to respective desired thicknesses. Then, after they are individually heated to remove the water and the solvent to form the two sheets, both sheets are attached to each other by heat and pressure. The sheet including the hydrophilic carbon blacks is then impregnated with a solution of a platinum group metal compound which is then decomposed by heat so that the platinum group metal and/or its oxides adheres to the hydrophilic portions of the reaction layer to provide the gas permeable electrode having the reaction layer comprising the hydrophilic portions and the hydrophobic portions, and the hydrophobic gas permeable layer.

The said process may be modified as described earlier by alternately superimposing a plurality of the reaction layers and a plurality of the gas permeable layers and/or by incorporating, for example, the nonwoven fabric sheet for reinforcement in the reaction layer and/or in the gas permeable layers.

In a gas permeable electrode in which the reaction layer is manufactured by the usual process which comprises mixing and pressing electrically conductive fine particles to which catalysts may adhere and hydrophobic fine powders and then sintering them to form the reaction layer, the electrically conductive fine particles and the hydrophobic powders are not sintered as desired by pressing and are relaxed at high temperature by thermal expansion of the powders. Therefore, many electrolyte passages and gas passages may be disconnected to interrupt the contact of the electrolyte with the catalyst in the reaction layer.

In order to overcome this drawback, a process may be employed which comprises mixing and hot-pressing electrically conductive fine particles and a binding agent, and cooling them under the hot-pressing condition or immediately thereafter to form a reaction layer. According to this process, since the mixed powders are sintered by the hot-pressing, the powers are firmly held, not to be moved. Since, moreover, the powders are cooled immediately after or during the hot-pressing, the powder condition at the time of the sintering is maintained to provide the electrolyte penetration passages and gas permeation passages with no disconnection as expected.

The gas permeable electrode of the present invention can generally be manufactured by employing the pressing technique, which may comprise flatly disposing the component particles on a press plate and then hot-pressing them to form the reaction layer. In this process, however, since the component particles cannnot be disposed evenly on the press plate, the resulting layer inherently is accompanied by the uneven densities not to form the uniformly dispersed passages for contacting the gas and the electrolyte. The operation efficiency of this process is also insufficient because the particles should be flatly disposed on the press plate having a relatively large area.

In order to improve this process, the following process may be employed. The component particles having been mixed and stirred are poured into a cistern of which the bottom is attached to a sheet, to float on the surface. Then the water is removed through the sheet so that the particles deposit on and accumulate on the sheet then the sheet is dried and hot-pressed to form a reaction layer.

The gas permeable electrode according to the present invention can be applied to a wide range of usages such as a methanol fuel cell, organic electrolysis, a secondary battery, an electrochemical reactor, galvanization, and the like.

In the gas permeable electrode according to the present invention, gases such as carbon dioxide which are produced as one of the reaction products in the reaction layer permeate to the hydrophobic fine apertures of the gas permeable layer before the supersaturation thereof where in the electrolyte the gases produced form gas bubbles which reach the rear side of the electrode to be released therefrom. Therefore, the surface of the reaction layer is never covered by the gases. The catalyst efficiency and the electrode characteristics are never lowered. Moreover, the purification of water and fuel is unnecessary.

Several preferred embodiments of this invention will be described with reference to the accompanying drawings. However, the present invention is not intended to be limited to these embodiments.

BRIEF DESCRIPTION OF THE DRAWINGS

FIGS. 1 (a) and (b) are prior art electrodes.

FIGS. 2 (a) and (b) are views of a first embodiment of the gas permeable electrode of the present invention.

FIG. 7 is an enlarged cross-sectional view of a fourth embodiment of the gas permeable electrode of the present invention.

FIGS. 8 (a) and (b) show manufacturing steps of the electrode of FIG. 7.

FIG. 9 is an enlarged cross-sectional view of a fifth embodiment of the gas permeable electrode of the present invention.

FIGS. 10 (a) and (b) are views of a sixth embodiment of the gas permeable electrode of the present invention.

FIGS. 11 (a) to (d) show manufacturing steps of the electrode of FIG. 10(a).

FIGS. 12 (a) and (b) are views of a seventh embodiment of the gas permeable electrode of the present invention.

FIGS. 15 to 17 are cross-sectional views of a ninth embodiment of the gas permeable electrode of the present invention which show a sequence of the manufacturing process of the electrode.

FIG. 18 is a schematic cross-sectional view of a tenth embodiment of the gas permeable electrode of the present invention.

FIG. 19 is a cross-sectional view of an eleventh embodiment of the gas permeable electrode of the present invention.

FIGS. 20 (a) to (d) are a series of manufacturing procedures of FIG. 19.

FIG. 21 is a partially omitted perspective view of a twelfth embodiment of a gas permeable electrode of the present invention.

FIG. 22 is an enlarged cross-sectional view of a wire rod.

FIG. 23 is a vertical sectional view of an apparatus for water electrolysis equipped with a thirteenth embodiment of a gas permeable electrode of the present invention.

FIGS. 24 and 25 (a) to (d) show a fourteenth embodiment of the gas permeable electrode of the present invention.

FIG. 2 (a) is a schematic cross sectional view of a first embodiment of a gas permeable electrode according to the present invention applied to a methanol fuel cell, and FIG. 2 (b) is an enlarged view of the portion indicated by A in FIG. 2 (a).

A reaction layer comprises a semi-hydrophobic porous body 3 prepared by impregnating hydrophobic resin into an electrically conductive porous body or electrically conductive fine particles supporting catalysts 2, or by mixing and dispersing them, which is then thermally treated. A gas permeable layer, on the other hand, comprises a highly hydrophobic porous body 4 prepared by impregnating hydrophobic resins into an electrically conductive porous body or fine particles, or by mixing and dispersing them, which are then thermally treated.

In this electrode, methanol which serves as the fuel is merely dissolved in water to be supplied to the surface of the reaction layer for circulation. The methanol passes through the hydrophobic layer in the form of vapor, and further passes through the hydrophobic portions of the reaction layer to be dissolved into the electrolyte present near the catalysts. It is oxidized on the nearby catalysts, and the carbon dioxide produced is dissolved into the electrolyte. Since the hydrophilic apertures and the hydrophobic apertures in the reaction layer are extremely fine and in proximity, the carbon dioxide produced evaporates into the hydrophobic fine apertures before the supersaturation thereof in the electrolyte where the gases produced form gas bubbles which reach the rear side of the electrode through the passage in the reverse direction of the methanol passages, and is released as gas bubbles into water.

Figure 3:
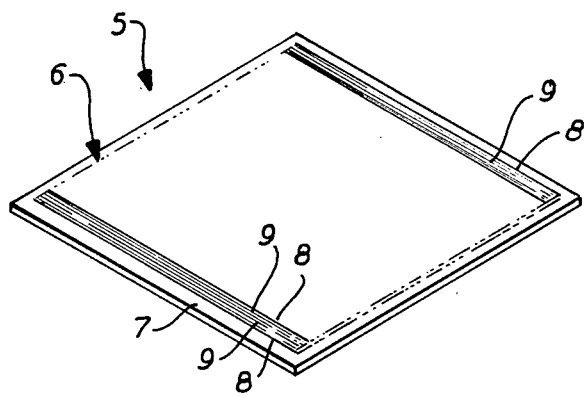
FIG. 3 is a perspective view of a second embodiment of the gas permeable electrode of the present invention.

FIG. 3 is a perspective view of a second embodiment of a gas permeable electrode according to the present invention, FIGS. 4 (a) to (i) show a series of manufacturing steps of the electrode of FIG. 3.

A gas permeable electrode 5 shown in FIG. 3 comprises a reaction layer 6 and a gas permeable layer 7. The reaction layer 6 comprises respective $10^5$ sheets of hydrophilic portions 8 and of hydrophobic portions 9 superimposed alternately. The hydrophilic portions 8 having $1\mu$ in width, 100 mm in length and 0.1 mm in thichness comprise platinum particles having a mean particle size of 50 Å, hydrophilic carbon blacks having a mean particle size of 450 Å and PTFE powders having a mean particle size of $0.3\mu$ in proportion of 0.7:7:3, and the hydrophobic portions 9 having $1\mu$ in width, 100 mm in length and 0.1 mm in thickness comprise hydrophobic carbon blacks having a mean particle size of 420 Å and PTFE powders having a mean particle size of $0.3\mu$ in the proportion of 7:3. The hydrophobic gas permeable layer 7 having 110 mm in width, 110 mm in length and 0.5 mm in thickness comprises hydrophobic carbon blacks having a mean particle size of 420 Å and PTFE powders having a mean particle size of $0.3\mu$ in the proportion of 6.5:3.5.

Figure 4A:
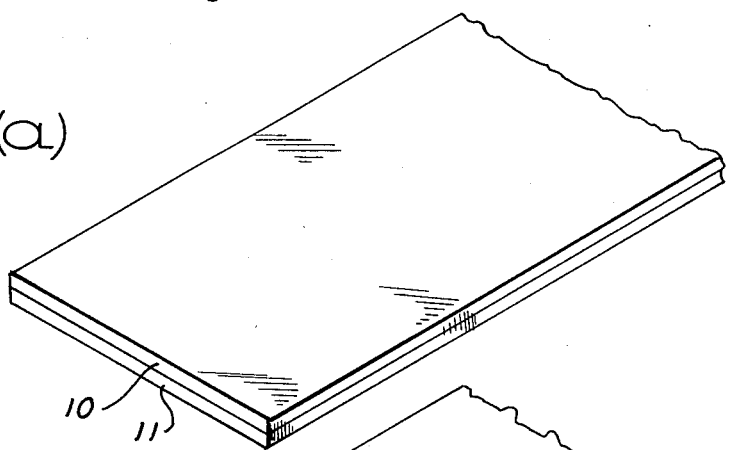
FIGS. 4 (a) to (i) show a series of manufacturing steps of the electrode of FIG. 3.
Figure 4B:
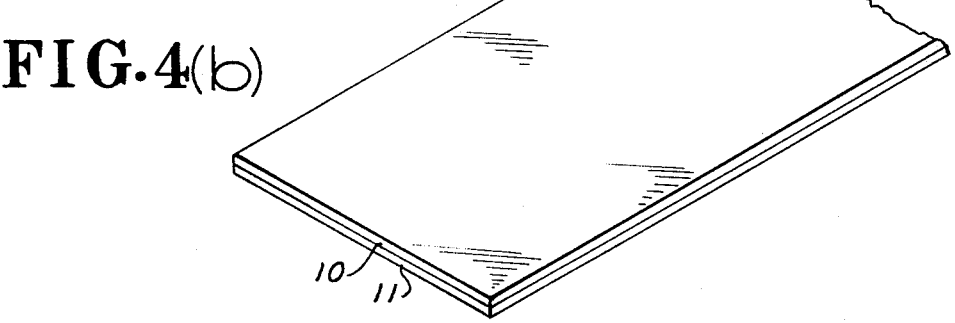
Figure 4C:
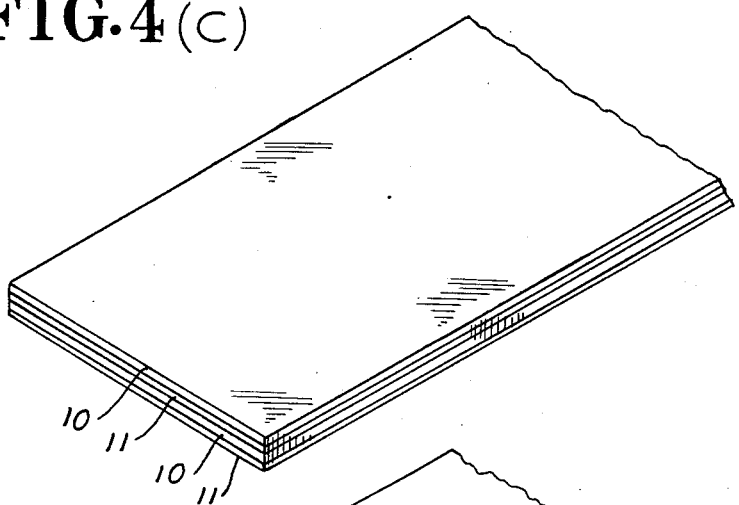
Figure 4D:
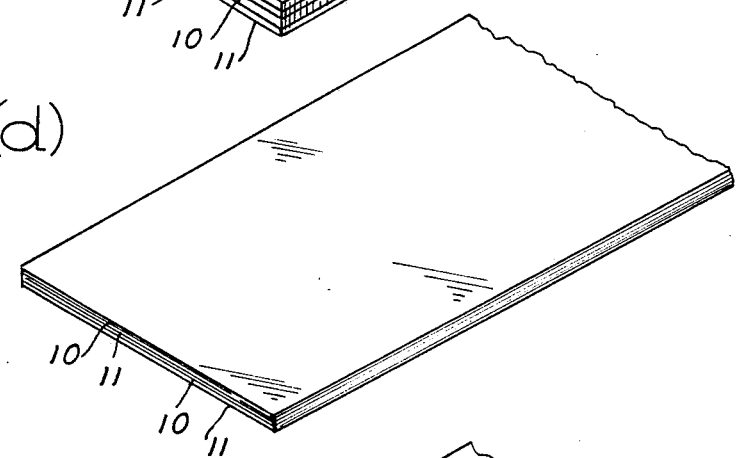
Figure 4E:
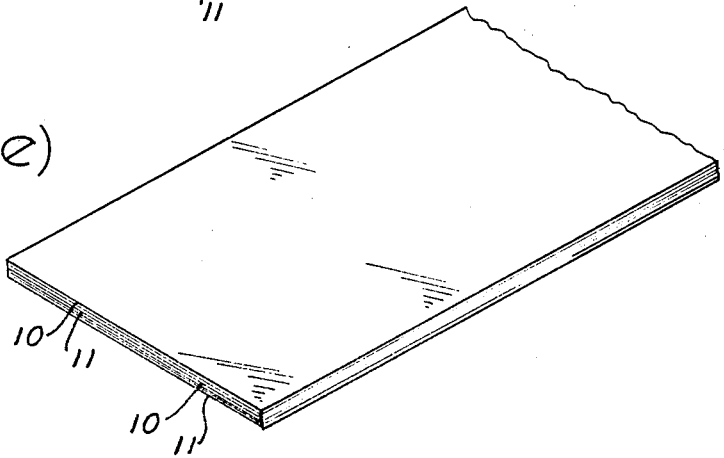
Figure 4F:
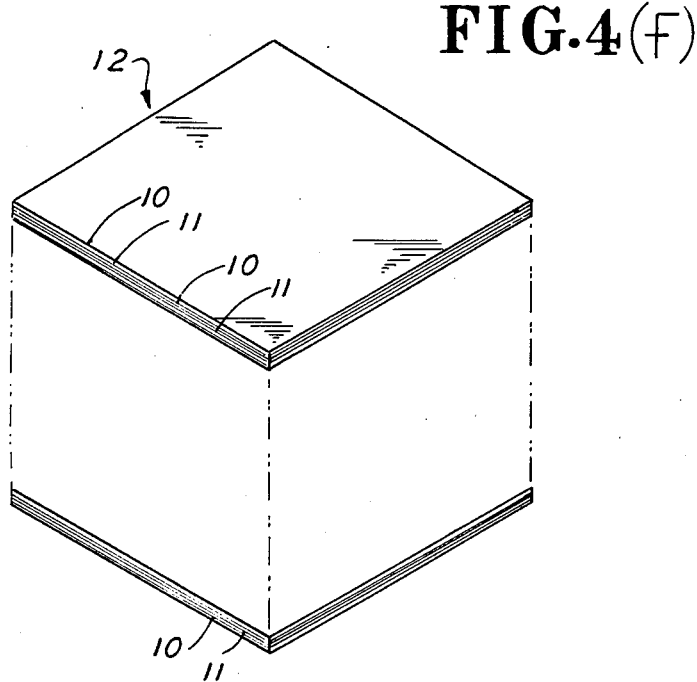
Figure 4G:
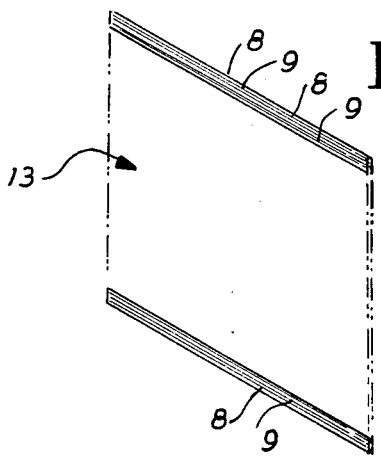
Figure 4H:
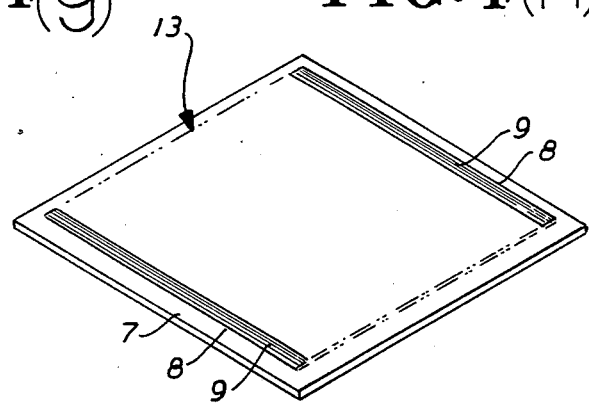
Figure 4I:
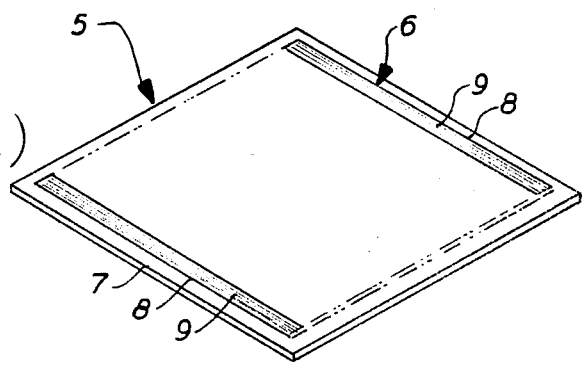

The electrode 5 having the above structure can be manufactured by the following procedures. As shown in FIG. 4 (a), a first sheet 10 and a second sheet 11 are superimposed to be rolled to a composite sheet having 2 mm in thickness (FIG. 4 (b)). The first sheet 10 having 100 mm in width, 3 m in length and 2 mm in thickness is formed by mixing hydrophilic carbon blacks having a mean particle size of 450 Å and PTFE powders having a mean particle size of $0.3\mu$ in the proportion of 7:3, and further mixing solvent naphtha thereto in the proportion of 1:1.8 and then molding it. The second sheet 11 having 100 mm in width, 3 m in length and 2 mm in thickness is formed by mixing hydrophobic carbon blacks having a mean particle size of 420 Å and PTFE powders having a mean particle size of $0.3\mu$ in the proportion of 7:3, and further mixing solvent naphtha thereto in the proportion of 1:1.8 and then molding it. The above composite sheet is then cut into two sheets and the two sheets are superimposed as shown in FIG. 4(c) to be rolled to another composite sheet having 2 mm of thickness (FIG. 4 (d)). Then, after this procedure is repeated ten times to make a multi-layer composite sheet shown in FIG. 4. (e), the sheet is cut every 100 mm of length, and the fifty sheets are superimposed and compressed to make a block 12 shown in FIG. 4 (f). After the block 12 is succesively and vertically sliced every 0.1 mm of thickness from the edge thereof, the sliced sheets are heated up to 280° C. to remove the solvent naphtha, thus forming a reaction layer raw material sheet 13 is 100 mm in width and 100 mm in length and having the hydrophilic portions and the hydrophobic portions superimposed alternately and in parallel as shown in FIG. 4 (g). In this situation, the hydrophilic portions 8 and the hydrophobic portions 9 are in the form of fibers. To this reaction layer, raw material sheet 13 is then attached to the hydrophobic gas permeable layer 7 which is 110 mm in width, 110 mm in length and 0.5 mm in thickness and which has been prepared by the molding of the mixture of hydrophobic carbon blacks having a mean particle size of 420 Å and PTFE powders having a mean particle size of $0.3\mu$ at 380° C. and 600 kg/cm² for three seconds as shown in FIG. 4 (h). Then, as shown in FIG. 4 (i), the solution of chloroplatinic acid is applied to the surface of the reaction layer raw material sheet 13 to impregnate the hydrophilic portions 8, and the sheet 13 is heated at 200° C. for 60 minutes to decompose the chloroplatinic acid, and further heated in a hydrogen atmosphere at 200° C. for one hour to attach the platinum to the hydrophilic portions 8, thus, making the sheet 13 into the reaction layer 6.

When the thus manufactured gas permeable electrode 5 is used as that for a fuel cell or the like, the electrolyte does not penetrate to the hydrophobic portions 9 of the reaction layer 6, but penetrates only to the hydrophilic portions 8 having the platinum catalysts to be in contact with most of the platinum catalysts. Therefore, most of the platinum catalysts in the reaction layer 6 contribute to the catalytic reactions.

Figure 5:
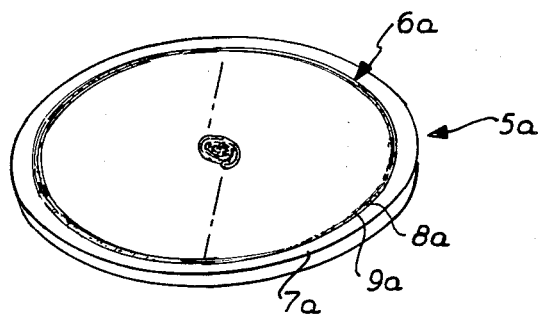
FIG. 5 is a perspective view of a third embodiment of the gas permeable electrode of the present invention.
Figure 6A:
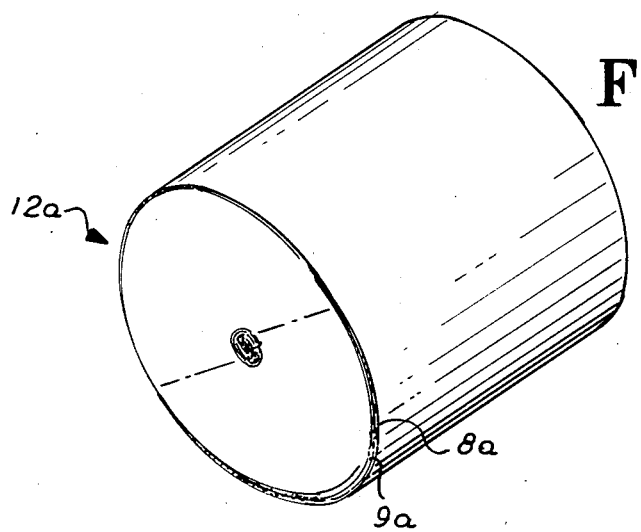
FIGS. 6 (a) to (d) show a series of manufacturing steps of the electrode of FIG. 5.
Figure 6B:
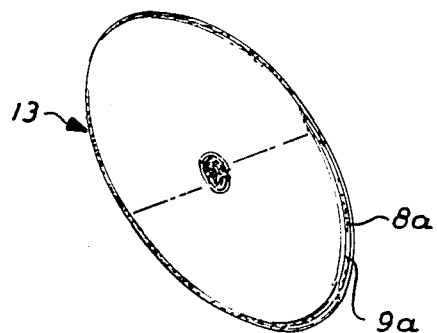
Figure 6C:
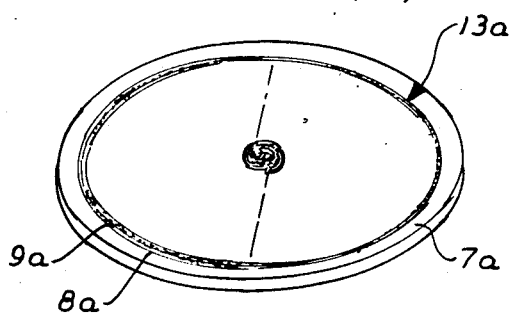
Figure 6D:
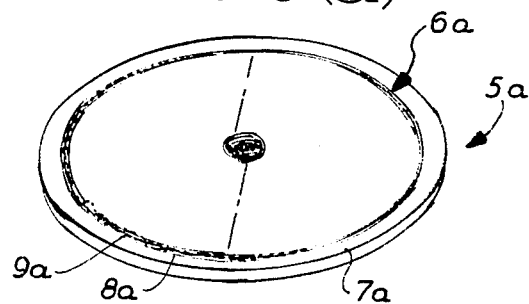

FIG. 5 is a perspective view of a third embodiment of a gas permeable electrode according to the present invention. FIGS. 6 (a) to (d) show a series of manufacturing steps of the electrode of FIG. 5. The third embodiment is a modification of the second embodiment.

A gas permeable electrode 5a of the present embodiment comprises, as shown in FIG. 5, hydrophilic portions 8a and hydrophobic portions 9a alternately superimposed in the direction of the radius, which are spirally wound.

In order to prepare the gas permeable electrode 5a having such a reaction layer 6a, a plurality of sheets are thinly rolled, as shown in FIG. 4 (a) of the above embodiment, and then spirally wound and compressed with each other to make a cylindrical block 12a having a plurality of layers as shown in FIG. 6 (a). After the block 12a is successively sliced from the edge thereof, the sliced sheets are heated up to 280° C. to remove the solvent naphtha, thus, forming a reaction layer raw material sheet 13a having the hydrophilic portions 8a and the hydrophobic portions 9a superimposed alternately in the direction of the radius, as shown in FIG. 6(b). To this reaction layer raw material sheet 13a is then thermally attached the circular and hydrophobic gas permeable layer 7a prepared by the molding of hydrophobic carbon blacks and PTFE powders as shown in FIG. 6 (c). Then, as shown in FIG. 6 (d), the solution of chloroplatinic acid is applied to the surface of the reaction layer raw material sheet 13a to impregnate the hydrophilic portions 8a, and the sheet 13a is heated as indicated in the second embodiment to decompose the chloroplatinic acid, and further heated to attach the platinum to the hydrophilic portions 8a, thus making the sheet 13a into the reaction layer 6a.

When the thus manufactured gas permeable electrode 5a is used as that for a fuel cell or the like, the electrolyte does not penetrate to the hydrophobic portions 9a of the reaction layer 6a, but penetrates only to the hydrophilic potions 8a having the platinum catalysts to be in contact with most of the platinum catalyst. Most of the platinum catalysts in the reacton layer 6a, therefore, contribute to the catalytic reactions.

If required, an electrically collecting member may be attached to the gas permeable layer. Although the solvent naphtha is employed as a solvent in the embodiment, the present inventon is not limited to this solvent. Water and such alcohols as ethanol, iso-propyl alcohol and the like, and such hydrocarbons as n-butane may be employed.

FIG. 7 is an enlarged cross sectional view of a fourth embodiment of a gas permeable electrode according to the present invention. FIGS. 8 (a) and (b) show manufacturing steps of the electrode of FIG. 7. This embodiment is a modification of the second embodiment.

A gas permeable electrode 5b of the present embodiment comprises, as shown in FIG. 7, hydrophilic portions 8b which comprise platinum powders, hydrophilic carbon blacks and PTFE powders, and the hydrophobic portions 9b, both of which are alternately superimposed to be molded to a reaction layer 6b in the shape of a sheet.

Such a gas permeable electrode 5b is manufactured according to the following procedures. At first, the composite sheet of the second embodiment shown in FIG. 4 (e) is prepared by the same procedures of the second embodiment. Then, after the composite sheet is crushed into powders 14 having a mean particle size of 10μ, the powders 14 are mixed with solvent naphtha in the proportion of 1:1.8 to be roll-molded to form a raw material sheet 13b as shown in FIG. 8 (b). Then the sheet 13b is made into the gas permeable electrode 5b by the same procedures described in the second embodiment. The thus manufactured electrode exhibits catalytic characteristics superior to those of the preceding embodiments.

FIG. 9 is an enlarged cross-sectional view of a fifth embodiment of a gas permeable electrode according to the present invention. This embodiment is a modification of the second embodiment.

A reaction layer 6c of a gas permeable electrode 5c shown in FIG. 9 having 100 mm in width, 100 mm in length and 0.1 mm in thickness comprises hydrophilic portions 8c, hydrophobic portions 9c and mixed portions 15, the hydrophilic portions 8c and the hydrophobic portions 9c, the total number of which amounts to $2.5 \times 10^4$, being alternately superimposed as shown in FIG. 9 with the mixed portions 15 intervening beyween them. The hydrophilic portions 8c having 1μ in width, 100 mm in length and 0.1 mm in height comprise platinum particles having a mean particle size of 50 Å, hydrophilic carbon blacks having a mean particle size of 450 Å and PTFE powders having a mean particle size of 0.3μ in the proportion in 0.7:7:3. The hydrophobic portions 9c having 1μ in width, 100 mm in length and 0.1 mm in height comprise hydrophobic carbon blacks having a mean particle size of 420 Å of the mean particle size and PTFE powders having a mean particle size of 0.3μ in the proportion of 7:3. The mixed portions 15 having 1μ in width, 100 mm in length and 0.1 mm in height comprise platinum particles having a mean particle size of 50 Å of the mean particle size, hydrophilic carbon blacks having a mean particle size of 450 Å of the mean particle size, hydrophobic carbon blacks having a mean particle size of 450 Å and PTFE powders having a mean particle size of 0.3μ in the proportion of 0.7:7:3:3.

The reaction layer 6c can be manufactured by employing a hydrophilic sheet, a hydrophobic sheet and a mixed sheet, and by employing similar procedures described in the second embodiment or the third embodiment.

In this gas permeable electrode 5c, since the reaction layer 6c comprises the hydrophilic portions 8c and the hydrophobic portions 9c alternately superimposed, and the mixed portions intervened therebetween, electrolyte penetrates to all of the hydrophilic portions and to the hydrophilic portions of the mixed portions to be in contact with most of the platinum catalysts and to strikingly enlarge the contact areas of the electrolyte with the gas permeable passages. A large quantity of electricity can, therefore, be flown in the electrode of this embodiment.

FIG. 10 (a) is a perspective view of a sixth embodiment of a gas permeable electrode according to the present invention, and FIG. 10 (b) is an enlarged view thereof. FIGS. 11 (a) to (d) show manufacturing steps of the electrode of FIG. 10 (a).

A reaction layer 6d of a gas permeable electrode 5d shown in FIGS. 10 (a) and (b) comprises hydrophilic portions 8d and hydrophobic portions 9d which are randomly dispersed in the direction of the thickness of a sheet and in the form of fibers and which have a mean thickness of 2μ and both ends of which are exposed to both sides. The hydrophilic portions 8d comprise hydrophilic carbon blacks and PTFE powders, and the hydrophobic portions 9d comprise hydrophobic carbon blacks and PTFE powders.

Such a gas permeable electrode 5d is manufactured according to the following procedures. After the mixture of the hydrophilic carbon blacks, the PTFE powders and water in the proportion of 7.5:2.5:40 having ductility is prepared, the mixture is extruded to form 500 pieces of hydrophilic wire rods having 1 mm wire diameter. In a similar way, 500 pieces of hydrophobic wire rods comprising hydrophobic carbon blacks, PTFE particles and water are prepared. Then, the 500 pieces of the hydrophilic wire rods and the 500 pieces of hydrophobic wire rods are bundled in the well-dispersed state as shown in FIG. 11 (a). These are then extruded to the wire rods 16 for the reaction layer having 1 mm wire diameter as shown in FIG. 11 (b). About 1200 pieces of the wire rods 16 for the reaction layer are, as shown in FIG. 11 (c), bundled and compressed to form a rod material 17 for the reaction layer having rectangular cross section which is 100 mm long and 100 mm broad. The rod material 17 for the reaction layer is sliced, as shown in FIG. 11 (d), by every 0.2 mm of thickness to form a reaction layer raw material 18. Thereafter, the reaction layer raw material 18 is thermally dried at 280° C. for 180 minutes to remove the water serving as solvent to form the gas permeable electrode 5d containing the reaction layer 6d shown in FIGS. 10 (a) and (b).

Although separate hydrophilic wire rods and hydrophobic wire rods are employed in this embodiment, composite wire rods may be employed which are composed of, for instance, hydrophilic core rods covered with hydrophobic wire materials.

In the gas permeable electrode of this embodiment, since the hydrophilic portions and the hydrophobic portions are randomly dispersed in the direction of the thickness of a sheet and in the form of fibers, the electrolyte penetration passage areas and the gas permeation passage areas are considerably large. The contact areas of the electrolyte and the gas are increased to promote reactions.

Figure 13:
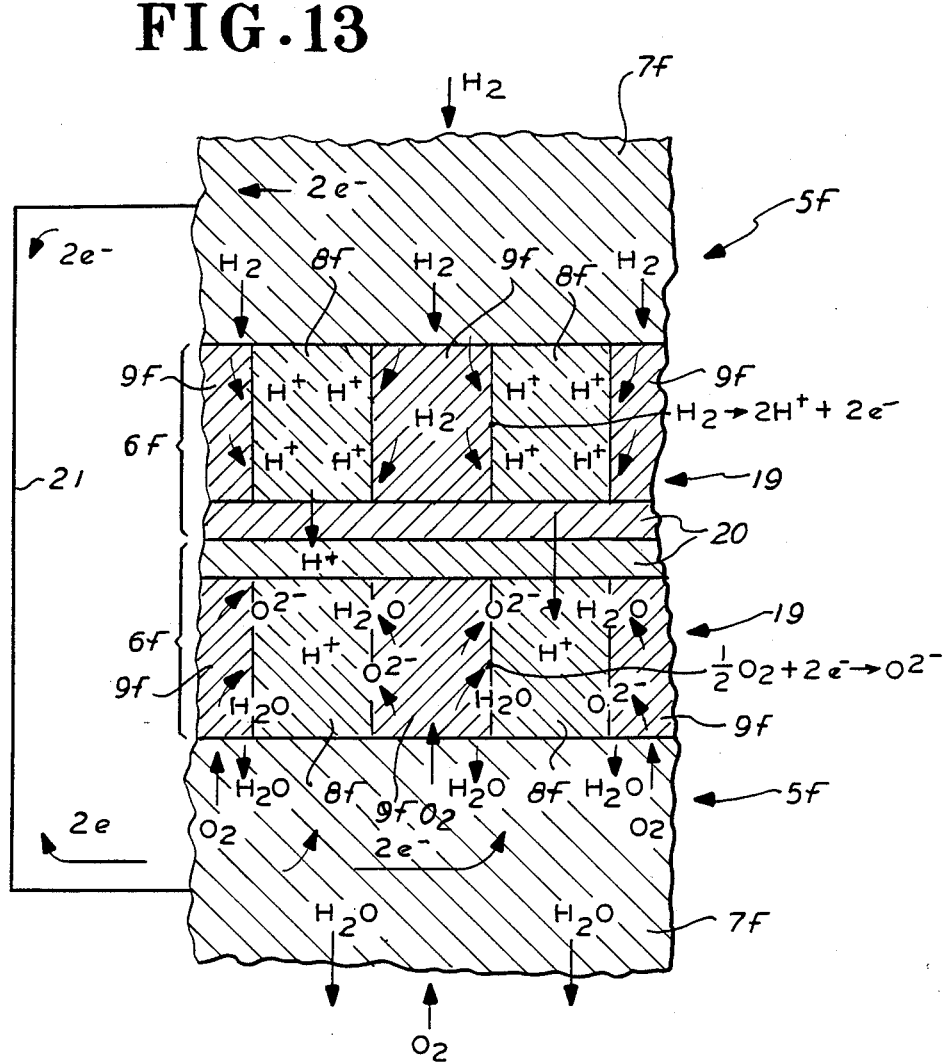
FIG. 13 is a partially enlarged schematic view of the electrode applied to a hydrogen-oxygen fuel cell.

FIG. 12 (a) is a cross sectional view of a gas permeable electrode of the seventh embodiment of the present invention. FIG. 12 (b) is a partially enlarged schematic view thereof. FIG. 13 is a partially enlarged schematic view of the electrode applied to a hydrogen-oxygen fuel cell.

In FIG. 12 (a), a gas permeable electrode 5f comprises a reaction layer 6f and a gas permeable layer 7f attached to each other.

The reaction layer 6f comprises a sheet 19 having 0.1 mm of thickness, 100 mm of width and 100 mm of length and comprising hydrophilic carbon blacks, hydrophobic carbon blacks and PTFE powders in the proportion of 4:3:3. On the hydrophilic carbon blacks of the sheet is supported 0.056 g of platinum catalysts. Ion exchange resin extends only to the hydrophilic portions of the sheet 19 to form an ion exchange resin film 20.

The platinum catalysts are fixed by the ion exchange resin. The gas permeable layer $7f$ comprises a sheet having 0.5 mm of thickness, 120 mm of width and 120 mm of length and comprising hydrophobic carbon blacks and PTFE powders in the proportion of 7:3.

In FIG. 12 (b), hydrophilic portions $8f$ comprise the hydrophilic carbon blacks, the PTFE powders, the platinum catalysts and the ion exchange resin, and hydrophobic portions $9f$ comprise the hydrophobic carbon blacks and the PTFE powders.

For example, two sheets of the gas permeable electrodes $5f$, as shown in FIG. 13, are superimposed with the ion exchange resin films 20 adjoining each other and are employed as a counter electrode of a hydrogen-oxygen fuel cell. When $H_2$ is supplied from the gas permeable layer side $7f$ of one of the gas permeable electrodes $5f$ (negative pole side) and $O_2$ is supplied from the gas permeable layer side $7f$ of the other gas permeable electrode $5f$ (positive pole side), the $H_2$ having entered into the gas permeable layer $7f$ of the former gas permeable electrode $5f$ permeates the hydrophobic portions $9f$ of the reaction layer $6f$ to reach the boundary with the hydrophilic portions to be made hydrogen ions at this point by the catalytic reaction of $H_2 \rightarrow 2H^+ + 2e^-$. While the $H^+$ migrates from the hydrophilic portions $8f$ into the ion exchange resin film 20 (cation exchange resin in this case), the $e^-$ flows to the positive pole side through an external lead 21. The $O_2$ having entered into the gas permeable layer $7f$ of the latter gas permeable electrode $5f$ permeates the hydrophobic portions $9f$ of the reaction layer $6f$ to reach the boundary with the hydrophilic portions to be made oxygen ions by the catalytic reaction of $\frac{1}{2}O_2 + 2e^- \rightarrow O^{2-}$ with the $2e^-$ flown from the negative pole side. The $O^{2-}$ reacts with the $H^+$ having migrated in the ion exchange resin film 20 to be converted into water by the reaction of $O^{2-} + 2H^+ \rightarrow H_2O$. The $H_2O$ is then vaporized to inversely permeate the gas permeable layer $7f$ to be discharged to the exterior. Since $2e^-$ are always released at the negative pole side to flow from the negative pole side to the positive pole side through the external lead, the electricity can be effectively taken out.

When the gas permeable electrode of the embodiment is employed as the positive pole of a fuel cell of methanol solution dissolved-type, the ion exchange resin film separates the methanol and hydrogen ion to prevent the electrode exhaustion due to oxidation.

In order to penetrate the ion exchange resin to the hydrophilic portions of the sheet 19 and to form the ion exchange resin film on the penetrated face, the mixed solution of liquid Nafion (trade name), ethanol and water, for instance, may be applied to a face of the sheet 19 and vacuum-sucked from the opposite face.

Since, in the gas permeable electrode of this embodiment, the catalysts supported on the hydrophilic portions of the reaction layer are fixed by the ion exchange resin, they are never exposed to electrolyte. During the use as the electrode of a secondary battery or a fuel cell of the solution dissolved type, the flowing-away of the catalysts and the migration or the coagulation of the catalysts at elevated temperature and the lowering of the catalytic activity of the hydrophilic portions never occur. Moreover, the efficiencies of charge and discharge are high, and a large quantity of electricity can be easily taken out, and the life is long. Since evaporation in water of the electrolyte can be avoided, less water supplement is required.

Figure 14:
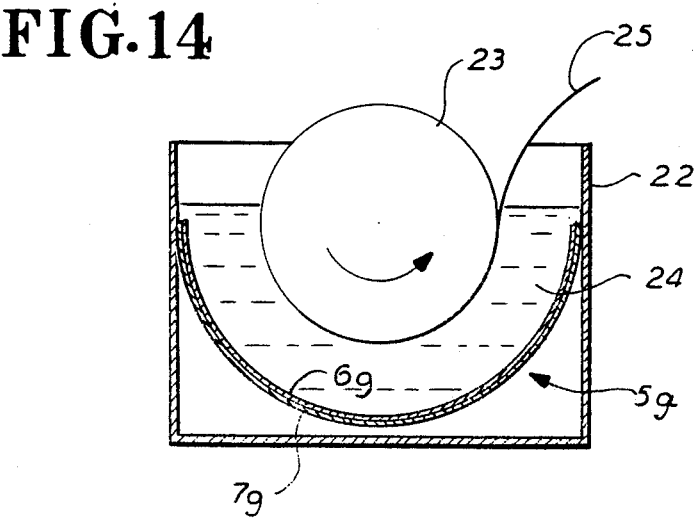
FIG. 14 is a cross-sectional view of an eighth embodiment of the gas permeable electrode of the present invention.

FIG. 14 is a cross sectional view of an eighth embodiment of the present invention which is a process for manufacturing copper foils by employing one of the gas permeable electrodes of the present invention.

As shown in FIG. 14, at the center of an electrolytic cell 22 is provided a drum-like rotating negative pole 23 made of stainless steel. A gas permeable electrode $5g$ comprising a reaction layer $6g$ comprising finely divided hydrophilic portions supported with Pt (which may be replaced with Pt-Ru) catalysts and finely divided hydrophobic portions, and a hydrophobic gas permeable layer $7g$, both layers being attached to each other, are positioned at the bottom of the cell 22 as a semi-cylindrical positive pole opposing the rotating negative pole 23. After the cell 22 is filled with a copper-galvanization solution 24 so that the top of the gas permeable electrode $5g$ is located below the surface of the copper-galvanization solution 24 and methanol is supplied to the solution 24, electrolysis is carried out forming a copper foil 25 on the lower semi-circumference of the rotating negative pole 23. The copper foil 25 thus produced is rolled to a reel (not shown) by rotating the negative pole 23 and pulling up the copper foil 25.

In this electrolysis, the methanol in the copper-galvanization solution 24 is decomposed in the hydrophilic portions of the reaction layer $6g$ of the gas permeable electrode $5g$ to generate $CO_2$ which is absorbed into the hydrophobic portions of the reaction layer $6g$ to permeate the gas permeable layer $7g$. The copper-galvanization solution 24 containing the methanol lowers the bath potential, and the decomposition (combustion) of the methanol lowers the power consumption. These can make the interelectrode distance less and the current density larger. Further, the lowering of the bath voltage and no generation of $O_2$ result in no oxidation of the electrode as well as of the copper foil so that the cell life of the present embodiment can be extended to several thousands hours while the life of a conventional cell is several hundreds hours.

FIGS. 15 to 17 are cross sectional views of a ninth embodiment of the present invention which show a sequence of the manufacturing process of a gas permeable electrode.

After the mixture of hydrophilic carbon blacks, hydrophobic carbon blacks and PTFE powders in the proportion of 7:3:3 is stirred, 1.1 g of these mixed particles 26 are, as shown in FIG. 15, poured onto water 27 of a filtering cistern 28 equipped with a filter paper 29 (which may be replaced with a filter cloth, a stainless steel mesh, a nylon cloth or a tetronic cloth) having 100 mm of length and 100 mm of width on a porous bottom plate 30 thereof, to float and to be uniformly dispersed onto the whole surface. After the water is sucked from a bottom discharge port 31 of the cistern 28, as shown in FIG. 16, to prepare the filter paper with the accumulated mixed particles 26 having 220μ of the nearly uniform thickness, the filter paper 29 with the accumulated mixed particles 26 is heated with a heater to completely remove the water. Thereafter, the mixed particles 26 on the filter paper 29 are, as shown in FIG. 17, bound together by hot-pressing to produce a reaction layer $6h$ having 0.15 mm of thickness, 100 mm of length and 100 mm of width.

The structure of the reaction layers $6h$ of one hundred sheets is examined by an optical microscope to find that most of them have no unevenness and that the passages for the contact between gas and electrolyte are uniformly and finely dispersed.

The reaction layer 6h is then stripped from the filter paper 29 and attached to a hydrophobic gas permeable layer to form a gas permeable electrode having a plurality of the layers.

Although no catalysts are supported in the above reaction layer 6h, such catalyst particles as Pt, Ir, Au, Ag, $IrO_2$, $RuO_2$, PdO particles may be supported therein.

When a gas permeable sheet comprising hydrophobic carbon blacks and PTFE powders is fitted in the cistern in place of the filter paper 29, the mixed particles accumulated on the gas permeable sheet are obtained which are then hot-pressed to form the reaction layer on the gas permeable layer.

The procedure of the present embodiment may be applied to a gas permeable layer of an electrode other than the reaction layer.

FIG. 18 is a schematic cross sectional view of a tenth embodiment of the present invention which is a manufacturing process of a reaction sheet or a gas permeable sheet for a gas permeable electrode. The tenth embodiment is a modification of the ninth embodiment.

The mixture, which is the same as that for the ninth embodiment, is, as shown in FIG. 18, poured onto water 27' of a cistern 28'. A tetronic screen 32 wound on a sheet winding roll 33 provided on one inner side of the cistern 28' is drawn out to be pulled up slopewise toward the other side of the cistern 28' with a particles compressing plate 34 simultaneously moving at the same rate so that the mixed particles 26' floating on the water 27' are deposited on the tetronic screen 32 which is then passed through a pair of guide rolls 35 to press the mixed particles 26' for the particle-binding and dehydration. After the tetronic screen 32 is, without further processing, passed through a heater 36 for drying to completely remove the water, the sheet-like mixed particles having been separated from the sheet 32 and cut to a desired length are bound together by hot-pressing to prepare belt-like reaction films having 0.15 mm of thickness.

The structure of the 100 reaction films thus prepared is examined by an optical microscope to find that most of them have no unevenness and that the passages for the contact between gas and electrolyte are uniformly and finely dispersed.

FIG. 19 is a cross sectional view of an eleventh embodiment of a gas permeable electrode according to the present invention. FIGS. 20 (a) to (d) are a series of manufacturing procedures thereof.

A gas permeable electrode 5i shown in FIG. 19 comprises a reaction layer 6i having 0.1 mm of thickness and 65% of porosity and a gas permeable layer 7i having 0.5 mm of thickness and 65% of porosity which are attached to each other. The reaction layer 6i comprises a non-woven fabric sheet 37 of carbon paper having 280μ of thickness made of fibers of 7μ on which is deposited a mixture of platinum serving as catalyst, hydrophobic carbon blacks, hydrophilic carbon blacks and PTFE powders in the proportion of 1:5:5:3. The gas permeable layer 7i is formed by molding a mixture of carbon blacks and PTFE powders.

The manufacturing process thereof will now be described.

To the non-woven fabric sheet 37 shown in FIG. 19 is applied a mixed solution of the carbon blacks, the PTFE powders, water and non-ionic Triton (trade name) serving as surface active agent in the proportion of 1:1:20:2. Then the sheet 37 is dried and heated at 280° C. for three hours to remove the water and the surface active agent to prepare a reaction layer raw material sheet 38 shown in FIG. 20 (b). The hydrophobic gas permeable layer 7i formed by molding the mixture of hydrophobic carbon blacks and PTFE powders is then thermally attached under pressure of 600 kg/cm² for three seconds at 380° C. to the above reaction layer raw material sheet 38 as shown in FIG. 20 (c). Thereafter, a chloroplatinic acid solution is applied to and impregnated into the reaction layer raw material sheet 38, and then it is decomposed by heating to 200° C., reduced in $H_2$ at 200° C. and deposited at 0.56 mg/cm² to prepare the reaction layer of 65% porosity to produce the gas permeable electrode 5i shown in FIG. 20 (d).

Since the gas permeable electrode 5i of this embodiment contains the non-woven fabric sheet 37 in its reaction layer 6i, it is difficult bend and warp and the flexural strength thereof is high. It is, therefore, never deformed or cracked in handling.

The non-woven sheet may be incorporated in the reaction layer and/or the gas permeable layer.

FIG. 21 is a partially omitted perspective view of a twelfth embodiment of a gas permeable electrode according to the present invention. FIG. 22 is an enlarged cross-sectional view of a wire rod.

A gas permeable electrode shown in FIG. 21 comprises a reaction layer 6j and a gas permeable layer 7j which are attached to each other. The reaction layer 6j having 0.1 mm of thickness comprises catalysts ($RuO_2$+$IrO_2$), hydrophobic carbon blacks and PTFE powders in the proportion of 3:3:2 and contains finely divided hydrophilic portions and hydrophobic portions. The gas permeable layer 7j having 0.5 mm of thickness comprises hydrophobic carbon blacks and PTFE powders in the proportion of 7:3. Onto the surface of the gas permeable layer 7j opposite to the reaction layer 6j is attached a collecting member 39 formed by networks of wire rods 40 with 0.5 mm of spacings, each of which is a Ti wire 41 of 0.3 mm size coated with Pt 42 of 5μ thickness as shown in FIG. 22. The Ti wires may be replaced with Ta wires, or Ti- or Ta-coated Cu wires and the Pt coating may be replaced with other platinum group metals and/or metal oxides' coating. Further, the above collecting member 39 may be embedded in the gas permeable layer 7j.

Since, in the gas permeable electrode of this embodiment, the collecting member comprises the networks or the like of the wire rods made of the Ti or Ta, or the Ti- or Ta-coated Cu with the contacting portions to the gas permeable layer being coated with the platinum group metals and/or its oxides, the collecting member having the acid-proof coating is never corroded, even though an acid is produced at the collecting member's side of the gas permeable layer. Further, the electrode has a small electrical resistance and a high collected current.

FIG. 23 is a vertical sectional view of an apparatus for water electrolysis equipped with a thirteenth embodiment of a gas permeable electrode of the present invention.

In FIG. 23, a gas permeable electrode 5k which comprises a reaction layer 6k and a gas permeable layer 7k attached to each other, is employed as positive pole in an electrolytic cell 43. Element 44 denotes a cathode which is the same electrode as the positive pole, and 45 denotes electrolyte which is a KOH aqueous solution in this embodiment.

Prior to the initiation of electrolysis, the spaces outside the respective gas permeable electrodes 7k of the both poles are filled with water 46. When electrolysis is carried out at a high current density condition, for instance at 1 A/cm$^2$, the KOH aqueous solution 45 impregnated in the reaction layers 6k of the both poles generates O$_2$ gas which disperses and permeates into the gas permeable layer 7k to be released to the exterior through the water. Simultaneously, the temperatures of both poles 5k, 44 rise due to the high current density to vaporize the water of the KOH aqueous solution in the reaction layer 6k, which, after having that has been saturated is released to the gas permeable layers 7k. However, because the water 46 fills in the spaces outside the gas permeable layers 7k, the passages of the gas permeable layers 7k are in the saturated state with the vapor. Since higher vapor pressure is maintained than that produced by the vaporization of the KOH aqueous solution, the vaporization from the KOH aqueous solution in the reaction layer 6k is prevented so that the rise of the KOH aqueous solution concentration in the reaction layer 6k can be suppressed.

Figure 25C:
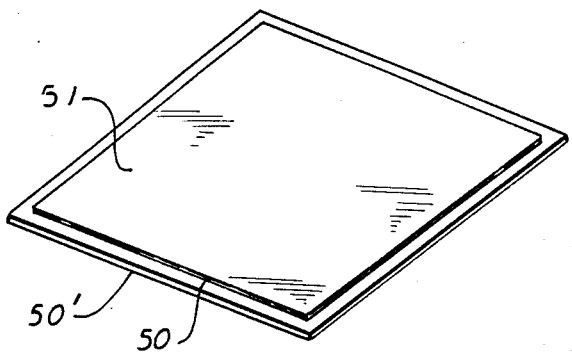
Figure 25D:
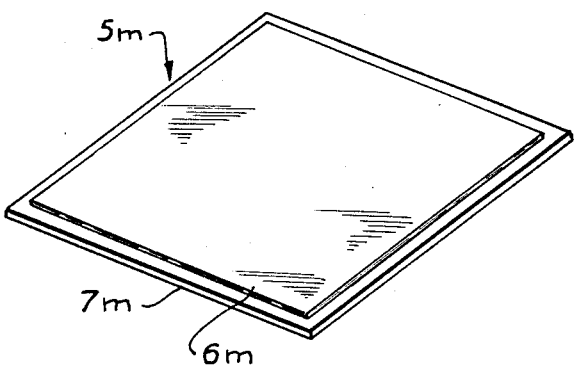

FIGS. 24 and 25 show a fourteenth embodiment of the invention. FIG. 24 is a cross sectional view of a filtering device employed in this embodiment, and FIGS. 25 (a) to (d) show a series of procedures for manufacturing a gas permeable electrode of this embodiment.

After hydrophilic carbon blacks, hydrophobic carbon blacks (in the proportion of 1:1) and water are mixed and stirred in a colloid mill at 50° C., PTFE powders are added to the mixed solution in the proportion of 2:8 to the carbon blacks and mixed and stirred. The mixed solution is then charged to a filtering device 47 to be filtered to form a cake 48 on a filtering sheet 49 as shown in FIG. 24. On the other hand, after hydrophobic carbon blacks and water are mixed and stirred in a colloid mill at 50° C., PTFE powders are added to the mixed solution in the proportion of 7:3 to the carbon blacks and mixed and stirred. The mixed solution is then charged to the filtering device 47 to be filtered to form another cake 48' on the filtering sheet by a similar procedure to that shown in FIG. 24. The cakes 48, 48' are then penetrated with such a solvent as ethanol, butanol, iso-propyl alcohol, an ammonium carbonate solution, an ammonium hydrocarbonate solution, solvent naphtha, acetone or the like, to be rolled to the respective thicknesses of 0.1 mm and 0.5 mm. Both cakes are then heated at 280° C. to be dried and to remove the ethanol to form two sheets 50, 50'. After both sheets 50, 50' are cut 100 mm by 100 mm and 110 mm, by 110 mm, respectively, they are attached to each other at 380° C. and 600 kg/cm$^2$ as shown in FIG. 25 (b). After a palladium chloride solution 51 is applied to and impregnated into the surface of the sheet 50 containing the hydrophilic carbon blacks as shown in FIG. 25 (c), the solution is thermally decomposed at 200° C. in air and reduced in H$_2$ to deposit palladium on the hydrophilic carbon blacks so that a gas permeable electrode 5m having a reaction layer 6m comprising hydrophilic portions and hydrophobic portions, and a hydrophobic gas permeable layer 7m is prepared, as shown in FIG. 25 (d).

Figure 26:
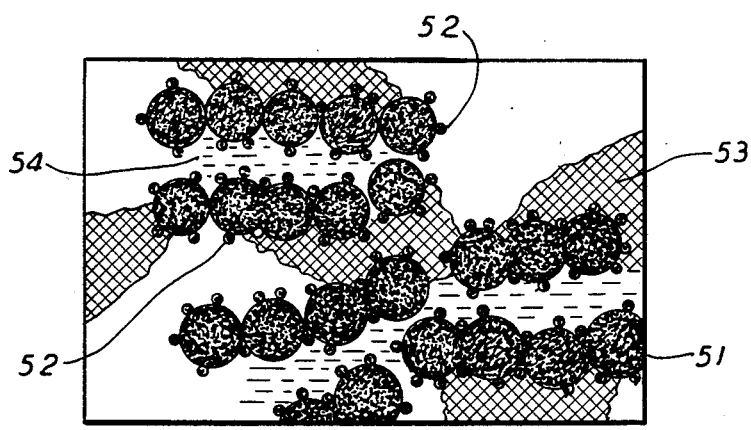
FIG. 26 shows a prior art gas permeable electrode.
Figure 27:
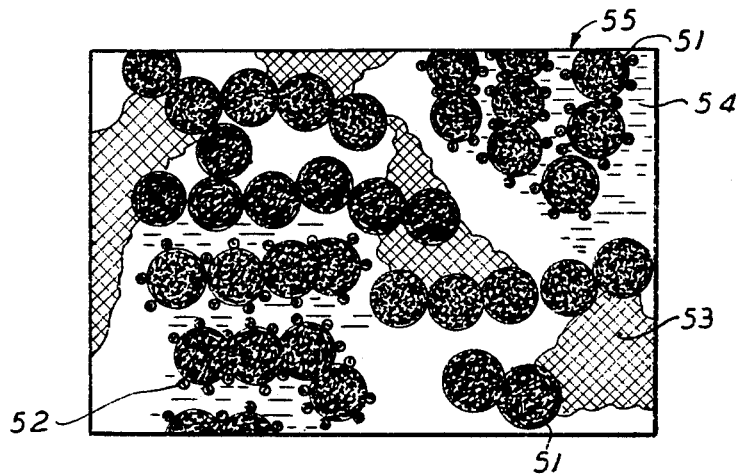
FIG. 27 shows a fifteenth embodiment of the gas permeable electrode of the present invention.

FIGS. 26 and 27 show a fifteenth embodiment of the present invention, which relates to a process for supporting catalyst particles. FIG. 26 is an enlarged cross-sectional view of catalyst particles prepared according to a conventional process. On the other hand, FIG. 27 is a corresponding enlarged cross-sectional view of the catalyst particles prepared according to the present embodiment.

In FIG. 26, electrically conductive particles 51 supporting catalyst metals 52, and hydrophobic resins 53 are uniformly mixed to form a skeleton. In this catalyst layer, only the catalyst metals 52 in the region 54 into which electrolyte penetrates contribute to a catalytic reaction, and the catalyst metals 52 in gas supply passages formed by the hydrophobic resins 53 are useless and wasted.

On the other hand, since, in the embodiment shown in FIG. 27, the size of electrically conductive particles 51 is 0.01~0.06μ which is one order smaller than the minor axis of hydrophobic resins 53, the electrically conductive particles 51 are aggregated to form an electrically conductive particles cluster 55. Since the electrically conductive particles cluster 55 is hydrophilic to the electrolyte, the electrolyte penetrates to the cluster. The electrically conductive particles 51 on the surface of the hydrophobic resins 53 together with the electrically conductive particles 51 of the opposing electrically conductive particles cluster 55 form, on the other hand, gas supply passages. Although this is the same as that for the conventional process, a sufficient volume of gas for the catalytic reaction of the electrically conductive particles cluster 55 can be supplied because the gas supply passages are located in the vicinity of the electrically conductive particles cluster 55. The electrically conductive particles cluster 55 are preferably connected just like skeletons for the penetration of the electrolyte to the whole catalytic layer.

The following Examples illustrate the present invention, but should not be construed to limit the invention.

EXAMPLE 1

The gas permeable electrode of FIG. 2 was employed for a methanol fuel cell which comprised a gas permeable layer comprising PTFE powders and carbon blacks (6:4) and having a copper-mesh compressed and attached thereto as electrically conductive material for collecting electricity, and a reaction layer comprising electrically conductive fine particles supporting binary catalysts (platinum 2 mg and ruthenium 1 mg per cm$^2$) and bound together with a hydrophobic binding agent. The two layers were attached to each other by press-molding, and sulfuric acid electrolyte (concentration: 2 mol) was impregnated and held in the hydrophilic portion of the reaction layer. Methanol was dissolved in water (concentration: 2 mol) and supplied to the hydrophobic surface to be circulated. The current density was 200 mA/cm$^2$ at 60° C. and 0.4 V, and the limiting current was 1200 mA/cm$^2$.

On the other hand, in the conventional electrode having the binary catalysts (2 mg of platinum and 1 mg of ruthenium) and employing the same electrolyte, the current density was 40 mA/cm$^2$ at 60° C. and 0.4 V, and the limiting current was 300 mA/cm$^2$.

The mixed particles composed of the same electrically conductive fine particles having the same supported quantities of the same catalysts as described above, and the hydrophobically treated carbon blacks were press-molded to form the reaction layer. In the electrode comprising this reaction layer and the above gas permeable layer which had been hot-pressed, the characteristic was further advanced to obtain the characteristic of 260 mA/cm$^2$ at 60° C. and 0.4 V.

EXAMPLE 2

The same electrode of Example 1 was used as that for lowering the voltage of a zinc electrolyzing bath. The electrolysis was carried out at 27° C. and at 3 mm of the interelectrode distance employing the zinc electrolyte containing 60 g of Zn and 270 g of $H_2SO_4$ per liter. The bath voltages obtained were 1.5 V at 0.5 A/cm$^2$ and 2.0 V at 1 A/cm$^2$.

In industrially electrodepositing zinc, oxygen is generated at the counter electrode to be discharged to the atmosphere. Since the polarization of the counter electrode is high, not less than 4 V of bath voltage is required. In comparison to the conventional electrode, the electrode of this Example can reduce the bath voltage by half, and can increase the current density (production rate) by a factor of 10 to enable the striking power saving and rapid production.

EXAMPLE 3

An electrolytic cell was charged with 0.1 liter of a 0.5M solution of potassium hydrogen carbonate ($KHCO_3$). A Pt mesh and an ion exchange membrane (Nafion 117) were employed as a positive pole and a diaphram respectively. A gas permeable electrode comprising a reaction layer comprising finely divided hydrophilic portions and hydrophobic portions and a gas permeable layer, both layers being attached to each other, was employed as an electrolytic reduction electrode (negative pole). The reaction layer having 0.1 mm thickness, 100 mm width and 100 mm height was formed by molding the mixture of lead blacks, hydrophobic carbon blacks (420 Å mean particle size) and PTFE particles (0.3$\mu$ mean particle size). The gas permeable layer having 0.4 mm thickness, 120 mm width and 120 mm height was formed by molding the mixture hydrophobic carbon blacks (420 Å mean particle size) and PTFE particles (0.3$\mu$ mean particle size). After the gas permeable electrode was fitted in the electrolytic cell, electrolytic reduction was carried out with carbon dioxide being supplied from the rear side of the electrode. The electrolysis potential (vs. SCE) was 1.4~1.45 V. After 10 minutes of electrolysis with a current density of 200 mA/cm$^2$, formic acid was obtained with a current efficiency of 70~75%.

According to a conventional method, on the other hand, an electrolytic cell was charged with 0.5 liter of a 0.5M solution of potassium hydrogen carbonate ($KHCO_3$). A lead plate having 0.5 mm thickness, 100 mm width and 100 mm height was fitted to the electrolytic cell as an n electrolytic reduction electrode (negative pole). Electrolytic reduction was carried out with carbon dioxide being bubbled into the potassium hydrocarbonate solution at the rate of 0.2 liter/minute. The electrolysis potential (vs. SCE) was 1.4~1.45 V. After 60 minutes, electrolysis with a current density of 4.8 mA/cm$^2$, the quantity of formic acid corresponding to a current efficiency of 76.5% was obtained.

In this Example, the current density was strikingly high, and the quantity of the organic compound produced per unit area was remarkably large compared to the conventional method.

What is claimed is:

1. A gas permeable electrode which comprises a gas permeable layer comprising hydrophobic resins and hydrophobic carbon blacks and a reaction layer comprising a semi-hydrophobic porous body prepared by the coagulation of hydrophobic resins, hydrophobic carbon blacks and hydrophilic carbon blacks, both layers being attached to each other producing a finished electrode, the electrolyte impregnating the hydrophilic carbon blacks of the reaction layer to be held therein, and the hydrophobic carbon blacks thereof constituting gas passages, the finished electrode being substantially free from surfactant.

2. A gas permeable electrode which comprises a gas permeable layer comprising hydrophobic resins and hydrophobic carbon blacks and a reaction layer comprising a semi-hydrophobic porous body prepared by the coagulation of hydrophobic resins, hydrophobic carbon blacks and hydrophilic carbon blacks supporting catalysts therein, both layers being attached to each other producing a finished electrode, the electrolyte impregnating the hydrophilic carbon blacks of the reaction layer to be held therein, and the hydrophobic carbon blacks thereof constituting gas passages, the finished electrode being substantially free from surfactant.

3. The gas permeable electrode as claimed in claim 2, wherein an electricity collecting member is attached to the gas permeable layer.

4. The gas permeable electrode as claimed in claim 2, wherein the hydrophobic portions comprise a plurality of thin hydrophobic fibers and the hydrophilic portions comprise a plurality of thin hydrophilic fibers, and the respective fibers are alternately superimposed.

5. The gas permeable electrode as claimed in claim 4, wherein the respective fibers which are spirally wound are alternately superimposed in the direction of the radius.

6. The gas permeable electrode as claimed in claim 2, wherein the reaction layer comprises finely divided powders which comprise the hydrophobic portions and hydrophilic portions.

7. In the gas permeable electrode as claimed in claim 2, wherein the reaction layer contains mixed hydrophobic-hydrophilic portions intervening between the hydrophobic portions and the hydrophilic portions, the characteristics of the mixed hydrophobic-hydrophilic portions being intermediate between those of the hydrophobic portions and the hydrophilic portions.

8. The gas permeable electrode as claimed in claim 2, wherein the hydrophobic portions and the hydrophilic portions of the reaction layer which are in the form of fibers are randomly dispersed in the direction of thickness, and both ends of which are exposed to both sides.

9. The gas permeable electrode as claimed in claim 2, wherein the reaction layer contains ion exchange resins other than the catalysts.

10. A gas permeable electrode which comprises a gas permeable layer comprising hydrophobic resins and hydrophobic carbon blacks and reaction layer comprising an ion exchange resin film and a semi-hydrophobic porous body prepared by the coagulation of hydrophobic resins, hydrophobic carbon blacks and hydrophilic carbon blacks, both layers being attached to each other producing a finished electrode, the electrolyte impregnating the hydrophilic carbon blacks of the reaction layer to be held therein, and the hydrophobic carbon blacks thereof constituting gas passages.

11. A gas permeable electrode which comprises a gas permeable layer comprising hydrophobic resins and hydrophobic carbon blacks and a reaction layer comprising an ion exchange resin film and a semi-hydrophobic porous body prepared by the coagulation of hydrophobic resins, hydrophobic carbon blacks and hydrophilic carbon blacks supporting catalysts therein, both layers being attached to each other producing a finished electrode, the electrolyte impregnating the hydrophilic carbon blacks of the reaction layer to be held therein, and the hydrophobic carbon blacks thereof constituting gas passages.

* * * * *